United States Patent [19]
Grainger

[11] 3,733,824
[45] May 22, 1973

[54] ANTIPOLLUTION JET ENGINE WITH REVERSIBLE AUXILIARY JET ENGINES OPERABLE INDEPENDENTLY TO SERVE AS AUXILIARY THRUSTERS AND BRAKES

[76] Inventor: Lewis M. D. Grainger, Glen Allen, Va. 73060

[22] Filed: July 20, 1971

[21] Appl. No.: 164,391

[52] U.S. Cl..................60/224, 60/39.23, 60/39.65, 60/232, 60/261
[51] Int. Cl............................................F02k 3/08
[58] Field of Search....................60/224, 225, 232, 60/261, 39.23, 39.65

[56] References Cited
UNITED STATES PATENTS

| | | | |
|---|---|---|---|
| 2,674,846 | 4/1954 | Bloomer | 60/39.65 |
| 2,857,740 | 10/1958 | Hall | 60/225 |
| 3,099,134 | 7/1963 | Calder | 60/39.65 |
| 3,387,457 | 6/1968 | Garraway | 60/224 |
| 3,442,082 | 5/1969 | Peterson | 60/224 |

*Primary Examiner*—Douglas Hart
*Attorney*—Elton H. Brown, Jr.

[57] ABSTRACT

An antipollution jet engine in which air is fed through the chamber walls of the combustion chamber downstream of the fuel oil nozzle. The air is caused to have a tangential swirling motion to assist in obtaining a complete burning mixture so as to burn all combustible material in the fuel to eliminate pollution.

Additional fuel is supplied to a downstream burner similarly provided with downstream air admission ports to create a circular tangential turbulence for a complete mixing and complete burning of the combustible materials. The function of the downstream burner is to assist in completely burning all of the combustible materials resulting from the first burners. The fuel for the first burners and the downstream burner is preheated to improve ignition and burning.

9 Claims, 12 Drawing Figures

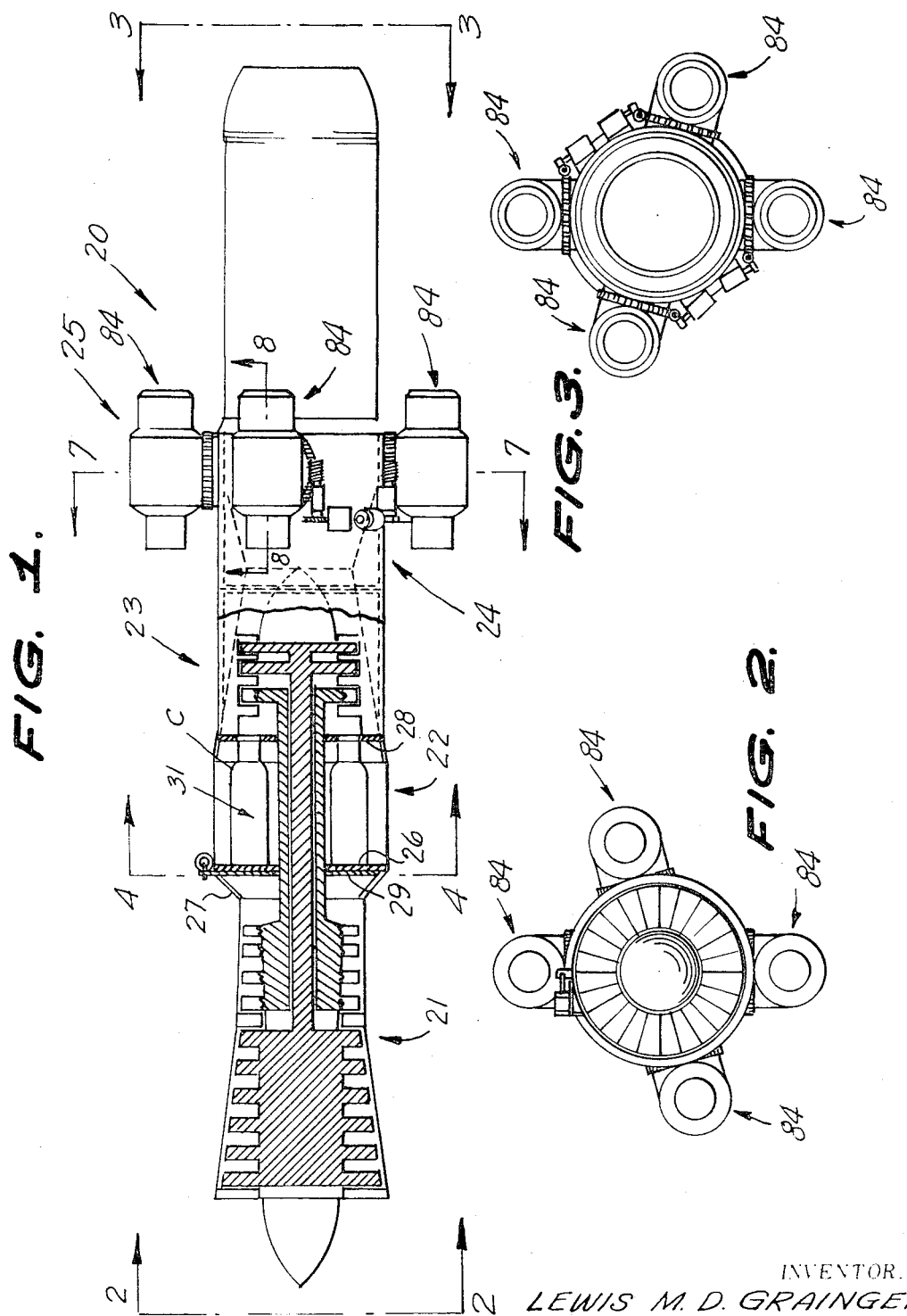

Patented May 22, 1973
3,733,824
4 Sheets-Sheet 2
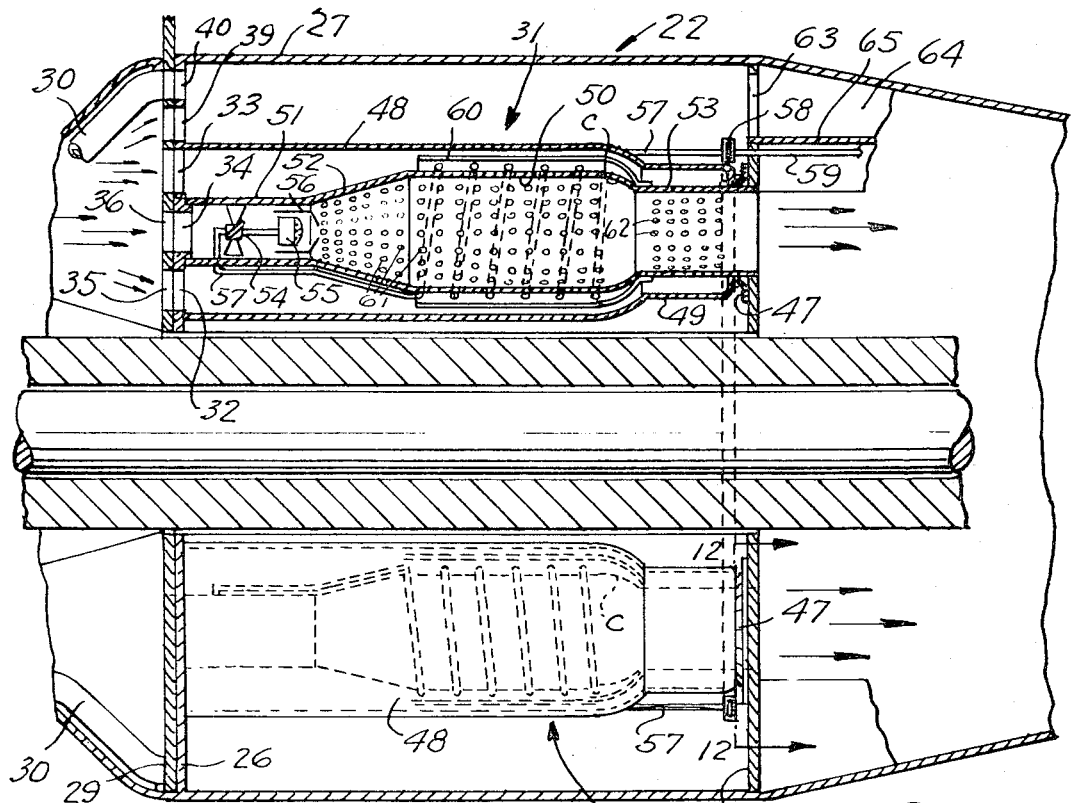
FIG. 6.
FIG. 4.
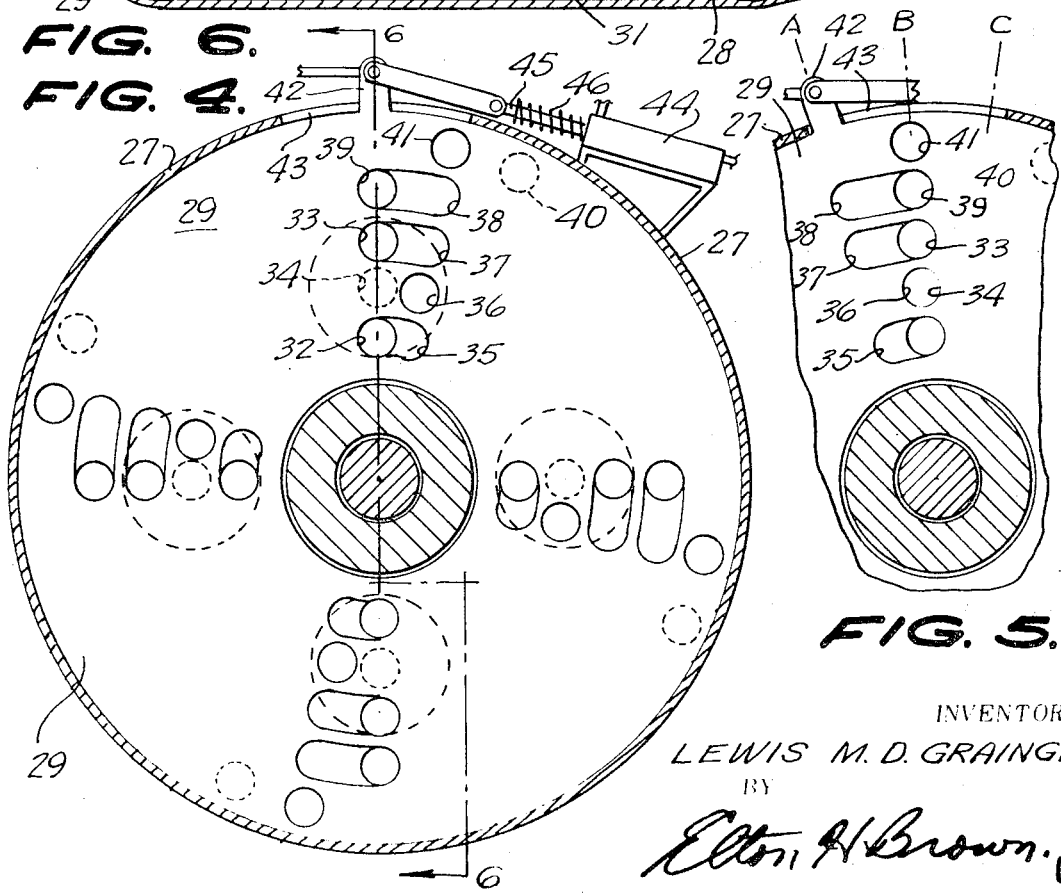
FIG. 5.
INVENTOR.
LEWIS M. D. GRAINGER,
BY
Elton H. Brown, Jr.

Patented May 22, 1973
3,733,824
4 Sheets-Sheet 3
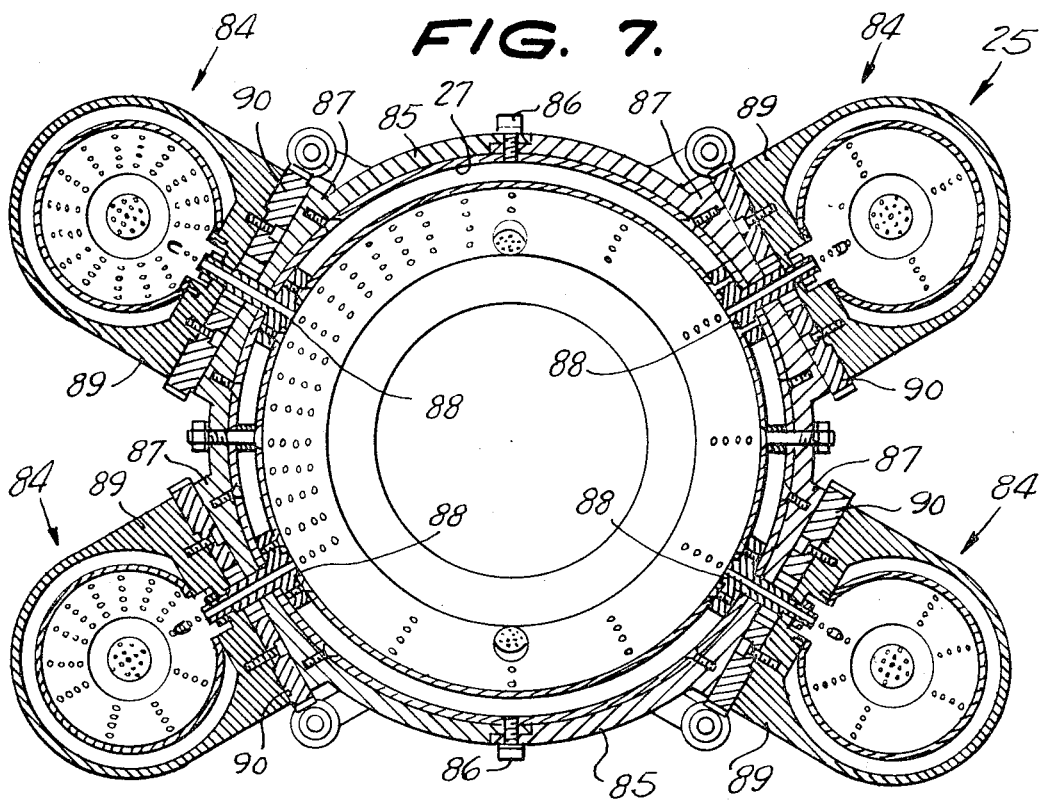
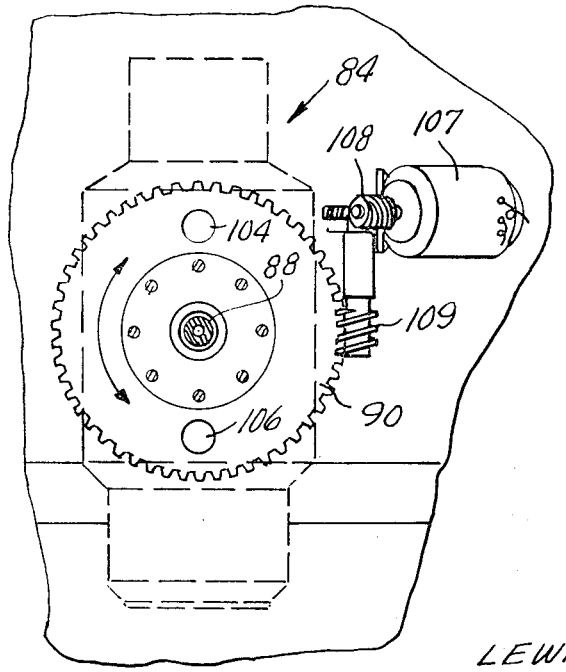
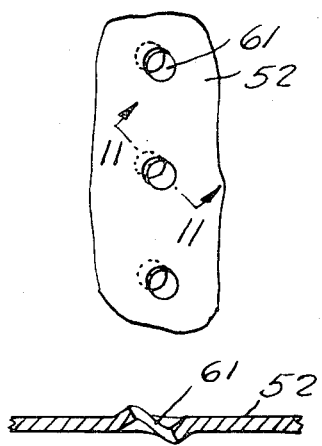
INVENTOR.
LEWIS M. D. GRAINGER,
BY
Elton H. Brown Jr.

Patented May 22, 1973 3,733,824
4 Sheets-Sheet 4
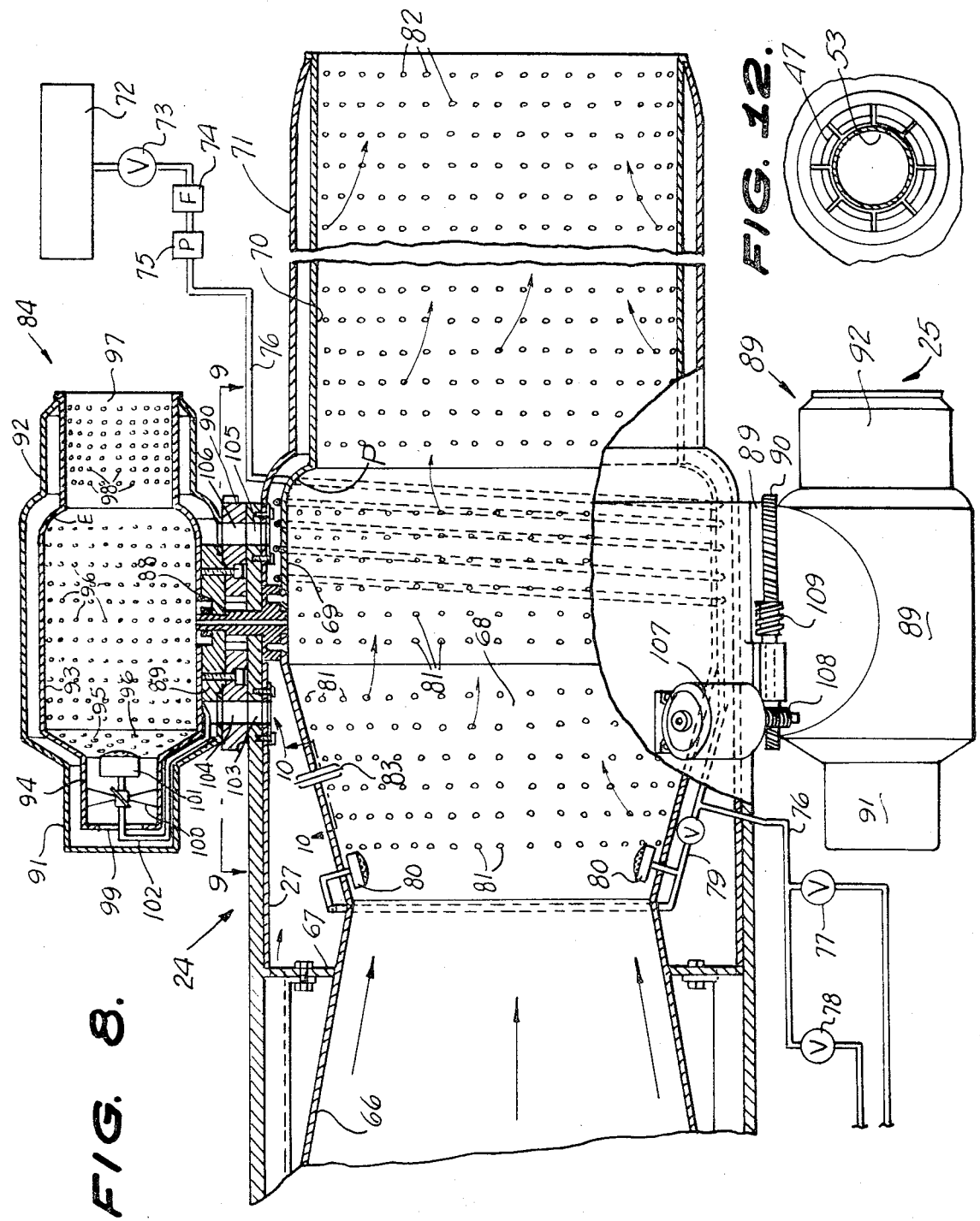

ANTIPOLLUTION JET ENGINE WITH REVERSIBLE AUXILIARY JET ENGINES OPERABLE INDEPENDENTLY TO SERVE AS AUXILIARY THRUSTERS AND BRAKES

BACKGROUND OF THE INVENTION

1. Field of the Invention

The present invention relates to jet engines of the type having an additional air inlet system for burning all of the fuel.

2. Summary of the Invention

In the present invention additional air is provided in the main combustion chambers to burn all of the combustible material in the oil. An additional combustion chamber also provides extra air at a downstream point to make sure that all of the combustible material in the fuel oil for the main burners is consumed. Oil may be fed into the downstream engine for fuel if this is found to be desirable. Physically reversible jet thrusters are pivotally secured to the main engine and are adapted to be physically reversed for acting as a brake.

The primary object of the invention is to provide a jet engine which completely eliminates air pollutent materials from its exhaust system and which provides a reversible jet engine as an adjunct to the main engine.

Other objects and advantages will become apparent in the following specification when considered in the light of the attached drawings.

BRIEF DESCRIPTION OF THE DRAWINGS

FIG. 1 is a side elevation of the invention, shown partially broken away and in section for convenience of illustration;

FIG. 2 is a front elevation of the engine from a position taken on the line 2—2 of FIG. 1, looking in the direction of the arrows;

FIG. 3 is a rear elevation of the engine, taken along a line 3—3 of FIG. 1, looking in the direction of the arrows;

FIG. 4 is a fragmentary transverse sectional view, taken along the line 4—4 of FIG. 1, looking in the direction of the arrows;

FIG. 5 is a fragmentary view similar to FIG. 4 illustrating the parts in a second position;

FIG. 6 is an enlarged fragmentary longitudinal sectional view;

FIG. 7 is an enlarged transverse sectional view, taken along the line 7—7 of FIG. 1, looking in the direction of the arrows;

FIG. 8 is an enlarged fragmentary longitudinal sectional view, taken along the line 8—8 of FIG. 1, looking in the direction of the arrows;

FIG. 9 is a top plan view of one of the thrust reversers;

FIG. 10 is a plan view of one of the air inlets;

FIG. 11 is an enlarged fragmentary sectional view, taken along the line 11—11 of FIG. 10, looking in the direction of the arrows; and FIG. 12 is an enlarged fragmentary transverse sectional view, taken along the line 12—12 of FIG. 6, looking in the direction of the arrows.

DESCRIPTION OF THE PREFERRED EMBODIMENT

Referring now to the drawings in detail, wherein like reference characters indicate like parts throughout the several figures, the reference numeral 20 indicates generally an antipollution turbo-jet engine constructed in accordance with the invention.

The antipollution jet engine includes an air compressor section 21, a main burner section 22, a turbine section 23, a downstream burner section 24 and a reversible auxiliary jet engine section 25.

The air compressor section 21 and turbine section 23 are of conventional construction and operate in a conventional manner. A transverse bulkhead 26 is of generally circular construction and is supported by the housing 27 of the jet engine 20. A second transverse bulkhead 28 is positioned downstream of the bulkhead 26 and is likewise supported by the housing 27. The housing 27 and bulkheads 26, 28 form the main burner section 22 of the jet engine 20. A circular valve plate 29 is positioned in engagement with the upstream side of the bulkhead 26 and is adapted to control the flow of air through the bulkhead 26. Compressed air from the air compressor section 21 flows rearwardly through the housing 27 to the valve plate 29. Conduits 30 extend from the valve plate 29 to a point outside of the jet engine 20 to provide a source of air under ram-compression during operation of the vehicle supporting the jet engine 20.

The main burner section 22 for purposes of illustration has been shown with four main burners indicated generally at 31. It should be understood however that any desired number of main burners 31 may be incorporated into the main burner section 22.

Each of the main burners 31 have a pair of auxiliary air ports 32, 33 and a primary air port 34. The air ports 32, 33 and 34 are arranged in radial alignment and are spaced apart outwardly from the center of the jet engine 20. The valve plate 29 has an elongate port 35 generally overlying the auxiliary air port 32. A circular air port 36 generally overlies the primary air port 34 and an elongate air port 37 generally overlies the auxiliary air port 33. An elongate air port 38 generally overlies an auxiliary air port 39 in the bulkhead 26 but outside of the main burner 31. An ambient air port 40 is formed in the bulkhead 26 outside of the auxiliary air port 39 and a generally circular air port 41 is formed in the valve plate 29 to align with the ambient air port 40.

A tongue 42 extends radially outwardly from the valve plate 29 through a slot 43 in the housing 27 and a hydraulic motor 44 has its piston rod 45 connected to the tongue 42 so that operation of the hydraulic motor 44 will move the valve plate 29 in one direction and the spring 46 will move it in the reverse direction. The valve plate 29 is adapted to control the supply of air flowing therethrough when the main burners 31 are in operation, but upon burner 31 failure for any reason the valve plate 29 shifts automatically to feed ambient air directly and only into the housing 27 to provide air for the downstream burner 24 and reversible auxiliary jet engines 25 to continue flight.

The transverse bulkhead 28 is provided with a plurality of spring mounting washers 47 which engage the downstream end of each of the main burners 31 and urge it forwardly into sealing contact with the bulkhead 26 with the upstream end engaged over flange F on air port 34. To quickly remove the main burners 31 they are disconnected from their fuel supply, pressed against spring washer 47 to disengage the upstream end from the bulkhead 26.

The main burner 31 includes an outer cylindrical housing 48 having a reduced diameter portion 49 at the downstream end thereof. Within the housing 48 is a cylindrical combustion chamber 50. A conduit 51 extends from the bulkhead 26 to an outwardly flared combustion chamber portion 52 which integrally joins the upstream end of the combustion chamber 50. A reduced diameter extension 53 extends integrally from the downstream end of the combustion chamber 50 and constitutes with its additional air supply a final burner for the main burner 31, and projects through the bulkhead 28. The combustion chamber 50 joins the reduced diameter portion 53 through an inwardly curved portion C.

A stationary vane unit 54 is mounted in the conduit 51 to cause air flowing therethrough to swirl. A fuel nozzle 55 is mounted centrally of the conduit 51 at the downstream end thereof. An electric ignitor 56 downstream of the nozzle 55 is provided for maintaining the ignition of the fuel flowing from the nozzle 55. A fuel line 57 extends from the nozzle 55 to a point outside of the conduit 51 and then extends to the combustion chamber 50 about which it is spirally wrapped. The fuel line 57 then extends to a circular manifold 58 which receives fuel from a fuel line 59 connected thereto. A shroud 60 encompasses the combustion chamber 50 and the fuel line 57 spirally wound thereabout to retain heat so that the fuel in the fuel line 57 will be vaporized prior to reaching the nozzle 55.

The flared combustion chamber portion 52 and the combustion chamber 50 are provided with a plurality of bores 61 extending therethrough with a slope that extends downstream and tangentially as can be seen in FIGS. 10 and 11. The reduced diameter extension final burner 53 is provided with a plurality of bores 62 which are identical in every respect with the bores 61.

Air from the air compressor section 21 flows through the housing 27 and through the valve plate 29 into the housing 48 through the bores 32, 33. The valve plate has elongate air ports 35, 37 which permit the full flow of air to reach the housing 48 during a considerable portion of the rotary adjustment of the valve plate 29. The port 36 is circular and the same size as the primary air port 34 so that as the valve plate 29 is rotated the quantity of air flowing through the primary air port 34 is throttled. The valve plate 29 may be manually adjusted by the pilot to suit atmospheric conditions but such manual adjustment is overridden by the hydraulic motor 44 when the main burner 31 fails for any reason. It can be thus seen that air from the compressors 21 provide not only primary air for the burner 31 but additional air as well which flows through the bores 61 and through the bores 62. A portion of the air from the compressors 21 flows into the space surrounding the burners 31 encompassed by the housing 27. Air flowing into the housing 27 flows through ports 63 in the bulkhead 28 into a space 64 between the housing 27 and an inner housing 65 surrounding the outlet ends of the main burners 31.

The burners 31 due to the reduced diameter extension 53 of the combustion chamber 50 and the additional air fed through the ports 61, 62 completely and totally consumes all of the combustable material in the fuel fed through the nozzle 55 so that all polluting materials are consumed.

The inner housing 65 has an inwardly converging downstream portion 66 spaced inwardly from the housing 27 and supported by a bulkhead 67. The inwardly converging portion 66 forms with a combustion chamber outwardly flaring portion 68 a venturi to increase the speed of flow of the gases passing therethrough. A generally cylindrical combustion chamber 69 extends rearwardly from the rear end of the outwardly flaring combustion chamber portion 68 and has a cylindrical reduced diameter extension 70 integrally formed on the rear end thereof. The housing 27 has a reduced diameter portion 71 surrounding the extension 70.

Fuel from a fuel tank 72 passes through the valve 73, filter 74, pump 75 to a fuel line 76 which is spirally wrapped around the combustion chamber 69 inside of the housing 27. The fuel line 76 extends to a pair of valves 77, 78 which control the flow of fuel to the fuel lines 102 to permit either or both pairs of the auxiliary engines 84 to be operated. A fuel line 79 extends from the fuel line 76 to feed a pair of nozzles 80 mounted in the outwardly flaring portion 68 closely adjacent the downstream end of the inwardly converging portion 66.

The outwardly flaring combustion chamber 68 and the combustion chamber 69 are provided with a plurality of bores 81 identical in every respect to the bores 61 described above. The reduced diameter extension 70 of the combustion chamber 69 is likewise provided with a plurality of bores 82 identical in every respect to the bores 61 described above. An electric ignitor 83 is mounted in the outwardly flaring portion 68 to ignite fuel from the nozzles 80. The combustion chamber 69 connects to the reduced diameter extension 70 by means of an inwardly curved portion P. The combustion chamber portion 68, combustion chamber 69, and inwardly curved portion P, together with their fuel supply, air supply and ignition constitute a jet burner. The reduced diameter portion 70 with its additional air supply constitutes a final burner for eliminating all pollutents from the exhaust gases.

All of the exhaust gases from the main burners 31 pass through the bulkhead 28, then into the inner housing 65, through the turbine section 23, into the reduced diameter portion 66, into the combustion chamber portion 68 and into the combustion chamber 69. If any combustible materials remain in the exhaust gases the air supplied through the bores 81 will be sufficient to cause its complete burning. In the event that extra power is desired fuel may be fed through the nozzles 80 and ignited with the ignitor 83 to create additional thrust as a sort of afterburner effect. The great supply of bores 81 are such that a surplus of air is fed into the combustion chamber 69 to burn all combustible materials therein without discharging air pollutents to the atmosphere. The reduced diameter portion 70 and its bores 82 serve as a final burner to provide insurance against any possible pollutents reaching the atmosphere.

A plurality of reversible auxiliary burners 84 are mounted in balanced relation on the housing 27 as can be seen in FIGS. 2 and 3. A semi-circular base plate 85 encompasses the housing 27 and is secured thereto by cap screws 86. The base plate 85 has a plurality of flat, circular foundations 87 formed thereon with a hollow pivot member 88 extending axially upwardly therethrough. The reversible auxiliary burners 84 have a housing casting 89 which has a flat inner face to which is bolted a ring gear 90. The casting 89 is pivotally mounted on and is secured to the hollow pivot member 88. The housing casting 89 includes an upstream reduced diameter portion 91 and a downstream reduced diameter portion 92. A generally cylindrical combustion chamber 93 is positioned centrally of the housing casting 89 and has a reduced diameter conduit 94 connected thereto by an outwardly flaring combustion chamber portion 95. The outwardly flaring combustion chamber 95 and the combustion chamber 93 have a plurality of bores 96 extending therethrough identical in every respect to the bores 61 described above. The combustion chamber 93 is connected by an inwardly curved portion E to a reduced diameter downstream portion 97 having a plurality of bores 98 opening therethrough and identical in every respect to the bores 61 described above. The conduit 94 has a primary air aperture 99 extending through the end thereof and communicating with the air in the housing 89. The downstream portion 97 constitutes a final burner for the auxiliary burners 84.

The conduit 94 has a stationary vane unit 100 mounted therein to cause the air flowing through the conduit 94 to swirl. A fuel nozzle 101 is mounted centrally of the conduit 94 adjacent the downstream end thereof. Fuel for the nozzle 101 is fed through a fuel line 102.

An aperture 103 through the housing 27 and base plate 85 communicates with an aperture 104 in the ring gear 90 which opens into the space within the housing 89. Air within the housing 27 can thus flow into the housing casting 89 to then flow through the primary air aperture 99, bores 96 and bores 98. Hot gases flowing through the hollow pivot member 88 ignite the fuel flowing from the nozzle 101 to power the reversible auxiliary burner 84. An aperture 105 similar to the aperture 103 communicates with an aperture 106 in the ring gear 90 to also feed air into the housing casting 89 to provide air for the operation of the auxiliary burners 84.

An electric motor 107 is mounted on the ring base plate 85 and is connected through gears 108, 109 to the ring gear 90 to rotate the auxiliary burners 84 about the pivot pin members 88. Upon rotation of the auxiliary burners 84 the air supply through the apertures 104, 106 is immediately cutoff so that the auxiliary burners 84 stop firing during the rotation. The fuel supply is automatically interrupted by valves 77, 78 during rotation. At the completion of the rotation the apertures 104, 106 are again aligned with the apertures 103, 105 but in reversed order so that the auxiliary burners 84 may then fire in a reverse direction to act as a brake to slow the aircraft. With the burners 84 in the original direction they may be used as auxiliary power when such is required.

In the use and operation of the invention each of the burner units is provided with an excess of air in the combustion chamber and each is provided with a reduced diameter downstream extension and a curved in connection between the combustion chamber and extension, so that the burning gases are retained slightly in the combustion chamber in the presences of the excess of air thus increasing the speed and swirling action to completely burn all combustible material in the fuel. The inwardly curved connections between the combustion chambers and the final burners will reach an extremely high temperature and will cause a cyclonic action in the gases as their speed is increased along with the swirling action.

Having thus described the preferred embodiment of the invention it should be understood that numerous structural modifications and adaptations may be resorted to without departing from the spirit of the invention.

What is claimed is:

1. An antipollution jet engine including a plurality of main burners each of said main burners including a combustion chamber, a fuel nozzle secured in one end of said combustion chamber, a supply of primary air connected to said one end of said combustion chamber, a supply of additional air passing through a plurality of bores in said combustion chamber sloped to direct the additional air tangentially and downstream to create a swirling action therein, said combustion chamber having a reduced diameter extension on the end thereof opposite said one end, said extension providing a downstream final burner and cooling section of said main burner and having a plurality of air directing bores to direct additional air tangentially and downstream, means detachably mounting said main burners in said jet engine, a downstream combustion chamber in said jet engine to receive the collective products of combustion of said main burners, a reduced diameter extension on said downstream combustion chamber, means for providing fuel to said downstream combustion chamber, means for supplying air to said downstream combustion chamber, a plurality of auxiliary jet engines mounted on said jet engine with the axes thereof parallel to the axis of said jet engine, means on said jet engine cooperating with means on said auxiliary jet engines for reversing the direction of said auxiliary jet engines for braking action, means for supplying fuel to said auxiliary jet engines, means for supplying air to said auxiliary jet engines from the additional air supply of said jet engine, means cooperating with said reversing means for interrupting the flow of fuel and air to said auxiliary jet engine during the reversing thereof, and selectively actuatable means for controlling the air supply to said main burners and the additional air supply.

2. A device as claimed in claim 1 wherein said reversible auxiliary jet engines are mounted on pivot pins extending outwardly from said jet engine and power driven means is provided for rotating said reversible auxiliary jet engines about said pivot pins to reverse the direction of thrust therefrom.

3. A device as claimed in claim 2 wherein the power means for reversing said reversible auxiliary jet engines includes a ring gear secured to each of said reversible auxiliary jet engines, an electric motor, and gears connecting said electric motor to said ring gear to rotate said ring gear with its attached jet engine upon rotation of said electric motor.

4. A device as claimed in claim 1 including an additional air supply in said downstream combustion chamber reduced diameter extension passing through a plurality of bores in said extension sloped to direct the additional air tangentially and downstream to create a swirling action therein.

5. A device as claimed in claim 1 wherein the means for controlling the air supply comprises a ported rotary plate valve and means for rotating said valve plate.

6. A device as claimed in claim 4 wherein said reversible auxiliary jet engines are mounted on pivot pins extending outwardly from said jet engine and power driven means is provided for rotating said reversible auxiliary jet engines about said pivot pins to reverse the direction of thrust therefrom.

7. A device as claimed in claim 6 wherein the power means for reversing said reversible auxiliary jet engines includes a ring gear secured to each of said reversible auxiliary jet engines, an electric motor, and gears connecting said electric motor to said ring gear to rotate said ring gear with its attached auxiliary jet engine upon rotation of said electric motor.

8. A device as claimed in claim 5 wherein said reversible auxiliary jet engines are mounted on pivot pins extending outwardly from said jet engine and power driven means is provided for rotating said reversible auxiliary jet engines about said pivot pins to reverse the direction of thrust therefrom.

9. A device as claimed in claim 8 wherein the power means for reversing said reversible auxiliary jet engines includes a ring gear secured to each of said reversible auxiliary jet engines, an electric motor, and gears connecting said electric motor to said ring gear to rotate said ring gear with its attached auxiliary jet engine upon rotation of said electric motor.

* * * * *